M. ARNDT.
AIR PYROMETER.
APPLICATION FILED FEB. 8, 1908.
1,065,651.
Patented June 24, 1913.
6 SHEETS—SHEET 3.
Fig. 3.
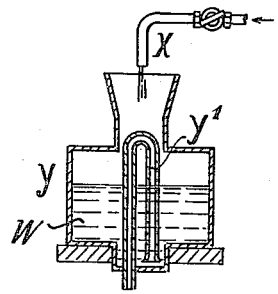
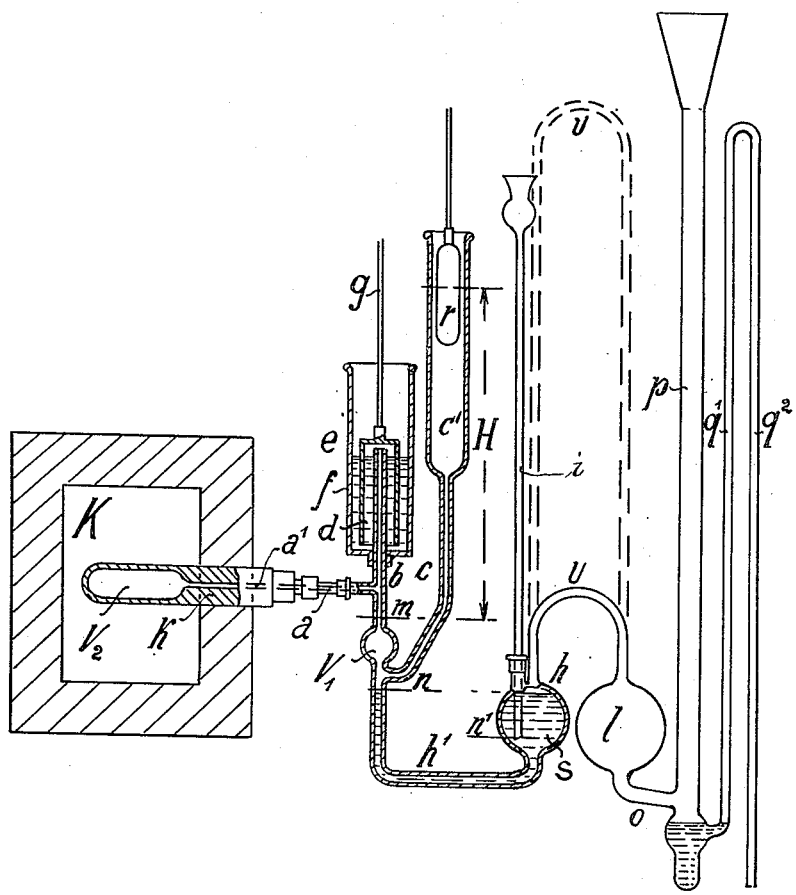
Witnesses.
Jesse N. Lutton.
M. T. Ellis.
Inventor.
Max Arndt
by Henry Orth Jr.
Atty.

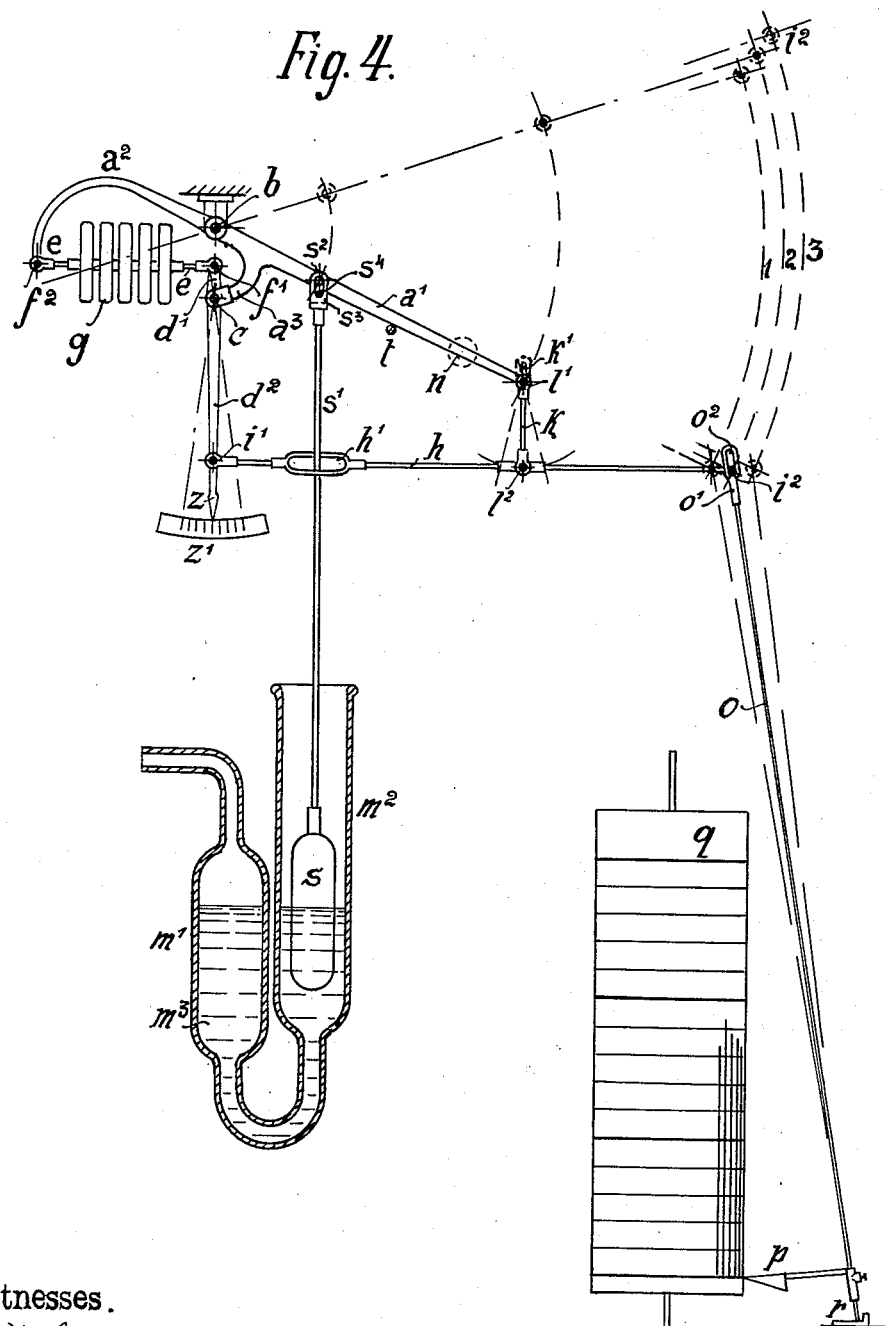

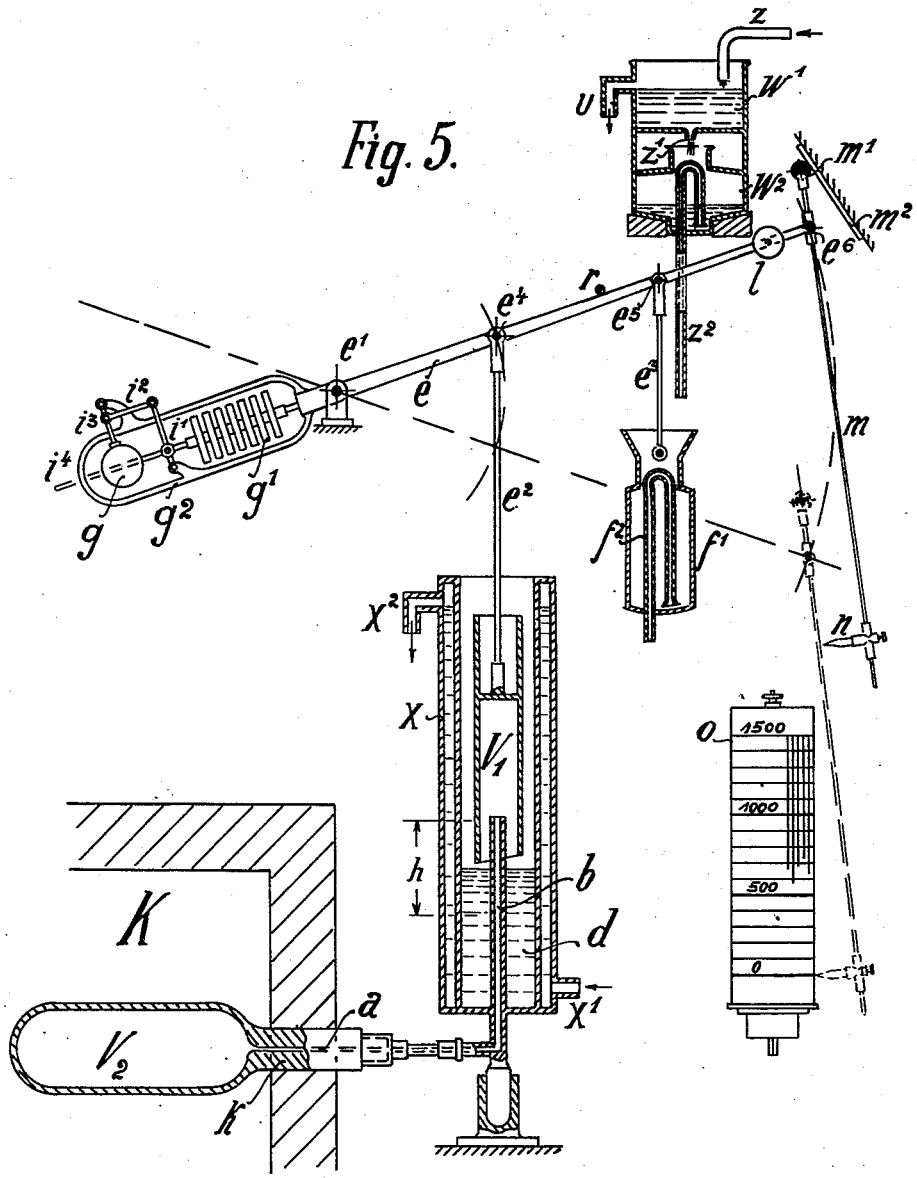

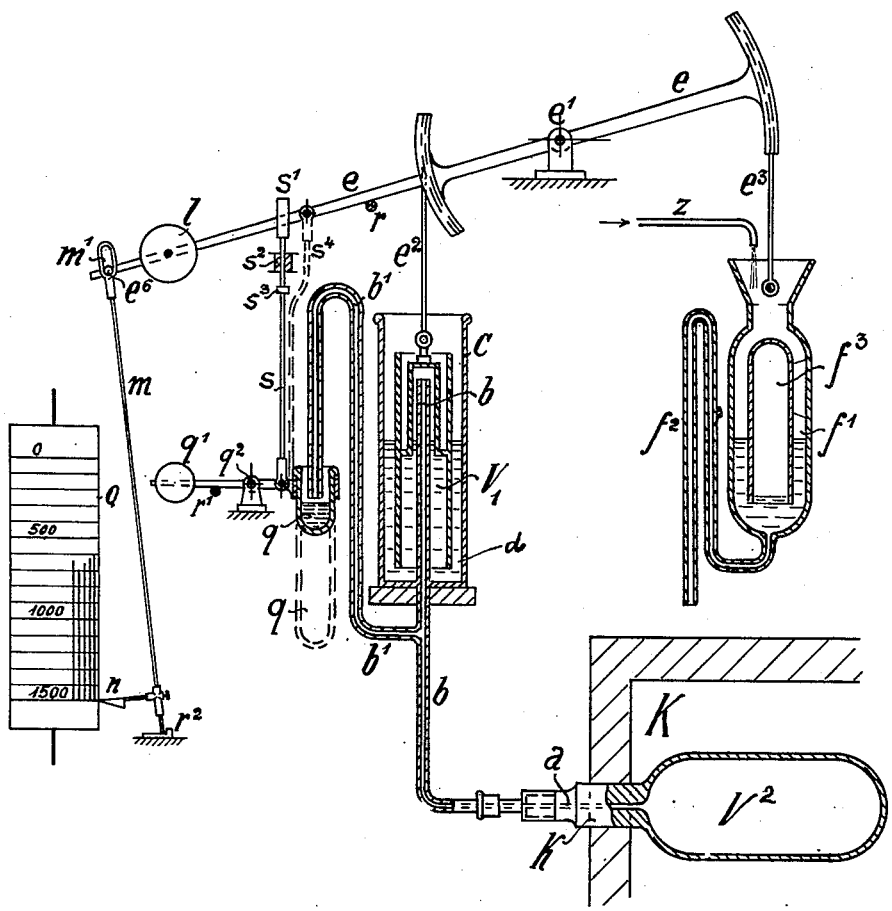

UNITED STATES PATENT OFFICE.

MAX ARNDT, OF AIX-LA-CHAPELLE, GERMANY.

AIR-PYROMETER.

1,065,651.    Specification of Letters Patent.    Patented June 24, 1913.

Application filed February 8, 1908. Serial No. 415,006.

*To all whom it may concern:*

Be it known that I, MAX ARNDT, a subject of the German Emperor, residing at Aix-la-Chapelle, Kingdom of Prussia, Germany, have invented certain new and useful Improvements in Air-Pyrometers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to pyrometers in which a volume of air under the temperature of the atmosphere is intercepted in a chamber and ejected into a second air-chamber which is exposed to the temperature to be measured.

An important object of the invention is to do away with the increase of pressure which takes place in known pyrometers of this kind. This is effected by a definite quantity of liquid, which remains constantly equal for each measurement, being used for operating the measuring device, the necessary measuring pressure in the measuring chamber remaining constantly the same for every optional difference of temperature and for every state of the barometer; further this measuring pressure is only so small that the measuring chamber is not endangered even at very high temperatures, and the total intercepted quantity of measuring air is not ejected into the measuring chamber, but only a part of the same which becomes constantly smaller with increasing difference of temperature.

In order that the invention may be clearly understood, reference is made to the accompanying drawing in which several embodiments are represented by way of example and in which:—

Figure 1:
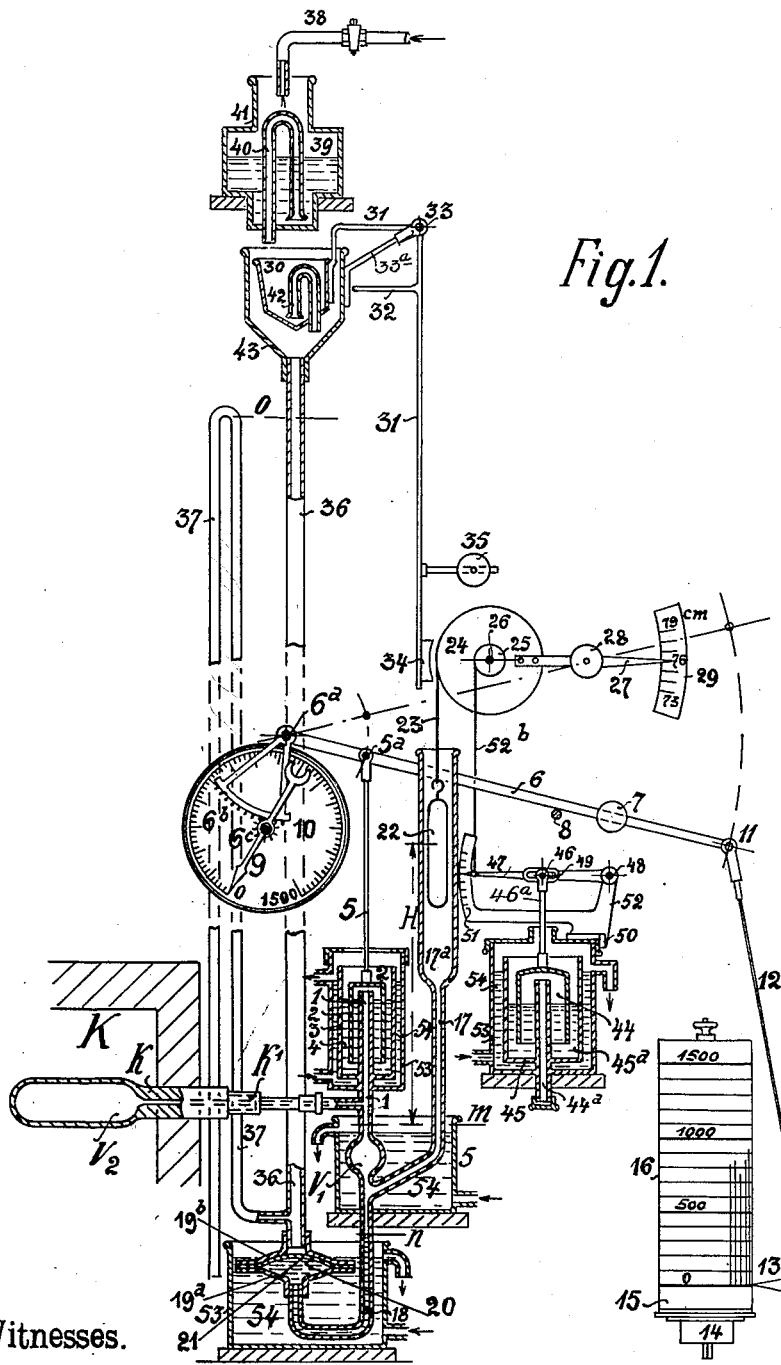
Figure 2:
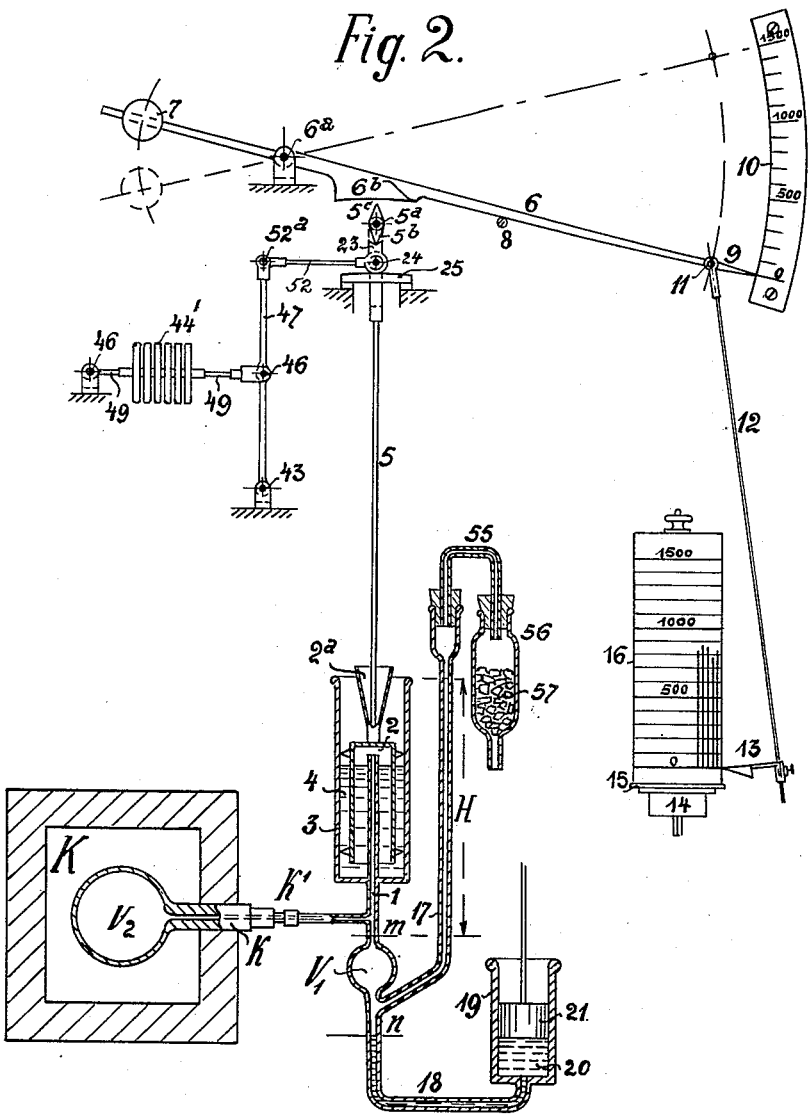

Figure 1 represents an elevation partly in section of one form of the new apparatus, Fig. 2 a similar view of a modification; Fig. 3 is a vertical section through another modified form, whereas Figs. 4, 5 and 6 are elevations partly in section of further modifications.

Referring to the drawing, into the hot channel K there is inserted the measuring body $k$ in such a manner that its measuring chamber $v^2$ is exposed to the temperature to be measured. The measuring chamber $v^2$ is connected by a capillary tube $k^1$ with a like tube 1; the latter branches off on the one hand from the air-chamber $v^1$, and on the other hand is so connected with a measuring device 2 that the latter receives through pipe 1 the pressure of the air which is to be measured. From the air-chamber $v^1$ there is branched off further a tube 18, and laterally from the latter a vertical tube 17 connected with the atmosphere; this tube 17 may have an enlargement $17^a$ for receiving a regulating body 22. The tube 18 is connected with optional means for producing pressure, for example a case or box $19^a$, $19^b$, the lower part $19^a$ of which has stretched over it a diaphragm 21 and contains liquid which, in the normal position, is adjusted in the tube 18 to its mark $n$. The upper part $19^b$ of the case is so connected with a vertical water-pipe 36 that a column of water rising in the vertical pipe 36 operates the diaphragm 21; this vertical pipe 36 may be provided with a funnel 43 and an intermittent siphon 37.

For the purpose of uniformly periodically filling the vertical pipe 36, there may be situated over the latter a reservoir 39, of water provided with an inlet pipe 38 and intermittent siphon 40, which reservoir may have a constriction or narrow part 41 for the purpose of certainly and quickly looking at the siphon 40.

The measuring device 2 connected with the capillary tube 1 consists of an inverted bell-jar 2 which covers the capillary tube 1 and dips into sealing liquid 4 in a receptacle 3. The measuring device, namely in this case the bell-jar 2, is weighted by a writing instrument by means of a rod 5 so that it is kept in its normal position until a definite pressure above that of the atmosphere is caused in it.

With the bell-jar 2 there is connected by means of a rod 5 and pin $5^a$, a registering device consisting of a lever 6 revoluble around a pivot $6^a$, which lever is supported in its lowest position by a stop 8, and carries by means of pin 11 a rod 12 for a writing-pen 13 which is placed against the strip of paper 16 of the drum 15. The lever 6 drives a toothed segment $6^a$ which engages with a toothed wheel $6^c$, the latter being connected with a needle 9 which is in front of a scale 10.

A mechanism for compensating the barometric influence on the device comprises a bell 44 partly filled with air, that dips into a sealing liquid $45^a$ such as glycerin or the like, contained within a container 45 that is surrounded by a vessel 53 containing or through which water or other liquid is caused to pass to maintain a uniform temperature. Passing through the bottoms of 45 and 53 and projecting into the air space beneath the bell 44 is a vent tube $44^a$ by means of which the height of the bell may be adjusted by venting more or less air from beneath the bell. The bell 44 has a rod $46^a$ projecting therefrom carrying a pin 46 loosely engaging a lever 47 pivoted at 48 in a bracket 52 mounted on 53. The lever 47 acts as a pointer, moving over a graduated scale 51 and is connected by a cord $52^b$ to a pulley or roller 25 mounted to rotate on an axle 26. The roller 25 is rigidly connected to a larger roller 24, to which is secured a cord 23 suspending a regulating or throttling body 22 suspended within the upper enlarged end $17^a$ of tube 17. On roller 24 is secured an arm or pointer 27 having an adjustable weight 28 by means of which the balance between the body 22 and bell 44 can be adjusted or regulated. This pointer moves over scale 29 graduated to read centimeters of mercury or barometric column, and is adjusted by weight 28 to actual barometric pressure.

Just before the beginning of each measuring operation the body 22 is prevented from moving by a brake 34 on the longer arm of a bell-crank rod 31 having an adjusting weight 35. This rod is pivoted at 33 in a bracket $33^a$ mounted on 43. On the shorter arm of the bell-crank rod 31 is mounted the vessel 30. The rod 31 has on its longer arm a stop 32 that may or may not rest against the funnel 43 when the vessel 30 is empty and the brake 34 released. The regulating body 22 is raised or lowered in the extension $17^a$ of the tube 17 in accordance with the barometric pressure, thereby controlling the height the liquid 20 rises in the tube 17, thereby varying the head H in accordance with the barometric pressure. This variation of head H results by reason of the variation of volume beneath the body 22, so that the lower the body 22 is, i. e., the less the volume beneath it, the higher will the liquid 20 rise in tube 17 and vice versa. The lever 47 has a slot 49 in which the pivot pin 46 is adjustable, so that the pointer 47 can be set in accordance with the outside temperature to scale 51.

In order to do away with the influence of the temperature of the atmosphere, the sealing or measuring liquid 20 and the air-chamber $v^1$, also the sealing liquid 4 and the air-chamber of the registering jar 2, can be maintained at an equal temperature by flowing water 54, and for this purpose they are surrounded with water receptacles provided with inlets and outlets.

Now the manner in which the apparatus works is as follows: If the vessel 39 (Fig. 1) is filled to the crown of the siphon 40 by means of the supply pipe 38, the siphon begins to work and first fills the vessel 30. This becomes heavier, overcomes the counter-weight 35 by means of the bell-crank lever 31, and puts the brake 34 on the pulley 24, so that the regulating body 22 cannot change its position during the operation of measuring. The measuring operation now begins by the water running over from the vessel 30 flowing into the vertical pipe 36 and filling the same, thus exercising a pressure on the diaphragm 21, whereupon the latter ejects liquid 20 from the part $19^a$ of the case. Liquid now rises in tube 18. As soon as the liquid seals the upwardly-open tube 17, a definite quantity of air at atmospheric pressure is intercepted in the air-chamber $v^1$. Now the air in the chamber $v^1$ and in the jar 2 has a definite temperature, whereas the air in the measuring chamber $v^2$, on the contrary, has a different temperature. Now if the liquid rises farther in the tube 18, chamber $v^1$ and tube 17, it ejects the air from the chamber $v^1$ in definite quantities, depending on the difference of temperature, partly under the measuring jar 2 and partly into the measuring chamber $v^2$. When the liquid has arrived at the mark m at the air chamber $v^1$, the height H of pressure is reached, and the ejection of the liquid by the diaphragm 21 is ended. The difference of temperature can now be read off on the scale 10 by means of the needle 9. In other words, if we indicate the temperature in chamber $v^1$ by $t^1$ and the temperature in chamber $v^2$ by $t^2$, the measuring fluid 20 in 18 rises into and seals chamber $v^1$ from the air in 17, and in further rising a quantity of air, dependent upon the temperature difference $t^2-t^1$, is displaced partly into the measuring bell 2 and partly into the measuring chamber $v^2$. When the measuring fluid in 18 has reached the mark m on the air chamber $v^1$, the liquid 20 cannot be forced any higher, since the diaphragm 21 has then been forced into its lowermost position against $19^a$, thereby causing a uniform displacement of air from $v^1$ under all conditions of operation. As soon as the cold air in $v^1$ enters $v^2$ expansion takes place, the bell 2 rises and by reason of the increase in pressure resulting from the expansion, the liquid 20 is forced downward also rising in 17 and $17^a$ around 22 to a height H. The temperature difference $t^2-t^1$ indicated by the hand 9 on scale 10 can be read and is recorded on the paper strip 16. If the temperature $t^2$ in K is greater than the temperature of the outside air $t^1$, then upon forcing the measured quantity of air from $v^1$ into $v^2$ this air is correspondingly expanded, consequently the measuring pressure corresponding to a column H must be the same or very nearly the same for every value corresponding to the temperature difference $t^2-t^1$, and the greater this temperature difference the greater will be the expansion and consequently the volume of air expanded into the bell 2. The column H should correspond as nearly as may be to the weight to be lifted, so that the bell 2 will be counterbalanced by the initial pressure due to the fluid in 18, leaving the excess pressure due to the expansion of the air to effect the movement of the bell. After the measuring operation is finished, the water rises still higher in the vertical pipe 36 until it reaches the height of the crown of the intermittent siphon 37 and the latter thus siphons the water out of the pipe. In this manner the original conditions are again brought about.

The device represented in Fig. 2 differs from that according to Fig. 1, in that the barometer-jar 44 Fig. 1 is replaced by a number of evacuated boxes $44^1$ Fig. 2 which communicate with one another in their interior; their elastic walls are influenced by the change of atmospheric pressure in the manner of the aneroid barometer inasmuch as they are pressed together when the atmospheric pressure rises, and when the atmospheric pressure falls again, they approach to their normal shape on account of their elasticity. These boxes $44^1$ are so connected by means of two rods 49 and two loose pins 46 on the one hand with a stationary bracket and, on the other hand, with a lever 47 movable around a pivot 43, that the movements of the boxes $44^1$ occasioned by the change of atmospheric pressure cause the centers of the pins 46 to be at different distances from one another at different positions of the barometer, and are transmitted to the lever 47 which is connected by means of a pin $52^a$ with a rod or link 52 which displaces a pulley 24 running on a curved face 25. With the link 52 there is rigidly connected further a step-bearing 23 which serves as bearing for a double knife-edge $5^b$, $5^c$, which carries the rod 5 by means of a pin $5^a$; this rod hangs freely in the knife-edge $5^b$ when a measurement is not taking place and therefore has some play in a funnel-like additional piece $2^a$ on the measuring jar 2. On the indicating lever 6 there is likewise a curved face $6^b$ so arranged that when a measuring operation is not taking place, it allows the knife-edge $5^c$ free play, in order that the latter can be moved by the barometer $44^1$ corresponding to the atmospheric pressure at any time, the indicating lever 6 resting on its stop 8.

In the construction represented in Fig. 3, $v^1$ is the air-chamber exposed to the temperature of the atmosphere, $v^2$ is the air-chamber exposed to the temperature to be measured, the parts K, $k$, $a^1$, $b$, $d$, $e$, are the same as the parts K, $k$, $k^1$, 1, 2, 3, in the apparatus according to Fig. 1. From the air-chamber $v^1$ bounded by the marks $m$ and $n$, there branches off a pressure tube $c$ which may have an enlargement $c^1$ for the purpose of receiving a barometric regulating body, $r$. A tube $h^1$ leads from the air-chamber $v^1$ to a receptacle $h$ for liquid $s$ which is connected with the means $p$ for producing hydraulic pressure. Between the pipe $p$ and the receptacle $h$ there may be connected an air-chamber $l$ by means of tubes $o$ and $u$. Lastly, a vertical tube $i$ may also dip into the receptacle $h$, so that the pressure produced by a column of liquid rising in the pipe $p$ will be released as soon as the lower end or opening of the tube $i$ is uncovered by the liquid so that the liquid from $p$ will rise in $i$. $q^1$ and $q^2$ is a siphon on the pressure-pipe $p$. Above the latter there is supported a receptacle $y$ with inflow pipe $x$ and siphon $y^1$, in which liquid $w$ collects.

The means for equalizing the fluctuations of the atmospheric pressure for the atmospheric pyrometer represented in Fig. 4 consists substantially of a liquid manometer filled with liquid $m^3$ and provided with a float $s$. A two-armed lever $a^1$, $a^2$ is revoluble around a pivot $b$ and possesses in addition a third arm $a^3$; from the pivot $c$ of the latter there is suspended a two-armed lever $d^1$, $d^2$ which carries by means of a pin $i^1$ a connecting-rod $h$; the latter is carried by means of its pin $l^2$ by a rod or link $k$ hanging from a pin $l^1$ on the arm $a^1$ of the lever. The connecting-rod $h$ carries by means of a pin $i^2$ a rod $o$ for a recording-pen $p$ which can move on a slowly rotating strip of paper $q$. An optional number of barometric aneroid-boxes $g$ is carried by means of the rod $e$ on the one hand by pin $f^2$ on the arm $a^2$ of the lever, and on the other hand by a pin $f^1$ on the reducing lever $d^1$, $d^2$. The latter may possess a needle or pointer $z$ which moves over a barometric scale $z^1$ for indicating the expansion of the aneroid boxes whereby the reading may be checked with a standard barometer. The connecting-rod $h$ may have an eye or loop $h^1$ which allows free play to the float-rod $s^1$. Further, the joints or hinges $s^3$ and $o^1$ may have loops $s^4$ and $o^2$, and also the head of the link $k$ may have a loop $k^1$.

In the pyrometer according to Fig. 5 in which a quantity of air is pressed out of the inverted jar $v^1$ into the measuring chamber $v^2$, the air-jar $v^1$ is raised out of the sealing liquid before the beginning of the measuring operation, in order that the tension of the air in the measuring chamber $v^2$ may be equal to the atmospheric pressure through the passages $a$, $b$. The jar $v^1$ is moved by means of a lever $e$ revoluble around a pivot $e^1$, which lever is alternately loaded and unloaded again by a vessel $f^1$ which is filled intermittently with water and emptied again, so that the inverted jar $v^1$ with a rod $e^2$ and pin $e^4$ are moved. A rod $m$ for a recording point $n$ is connected with the lever $e$ by means of a pin $e^6$. The rod $m$ carries the recording point $n$ which moves against a drum $o$ driven by clockwork. $l$ is a regulating weight. The purpose of the sloping face $m^2$ is to lift the recording point $n$ away from the drum $o$ by means of pulley $m^1$ when it is not wished to measure. In the frame $g^2$ there is arranged a number of aneroid boxes $g^1$; further, on the frame $g^2$ there is attached a weight $g$ which is influenced by the boxes $g^1$ so that it approaches nearer to the pivot $e^1$ when the barometer rises, but is removed therefrom when the barometer falls, whereby the action of the vessel $f^1$ filled with water is different. The weight $g$ is shifted by means of a rod $i^4$ connected with the boxes $g^1$ or by means of a link $i^2$ connecting two levers $i^1$, $i^3$.

In Fig. 6 another device in which a quantity of air is sucked out of the measuring chamber $v^2$ to the jar $v^1$ for eliminating the barometric influence from the measuring operation is represented, an air-jar $f^3$ being arranged fixed in the receptacle $f^2$ for water. As this jar $f^3$ communicates with the atmosphere when the vessel $f^1$ is emptied, when the latter is being filled, the higher the barometer is, the less water goes into the jar $f^3$. Consequently the weight of water contained in the vessel $f^1$ for starting the siphon $f^2$ is less when the barometer is high than when it is low. In this pyrometer the air-jar $v^1$ remains continuously immersed in the liquid $d$, and is therefore connected with a device for equalizing the pressure, which may be a tube $b^1$ provided with a liquid closure $q$ which closes its mouth during the time of measurement, but at other times opens it to the atmosphere. The liquid closure $q$ may be controlled by means of a rod $s$, $s^1$, $s^3$, operated by a lever $c$ and guided by a guide $s^2$, as well as by means of a two-armed lever revoluble around a pivot $q^2$ and connected with the rod $s$, which lever on the one hand carries a weight $q^1$ and on the other hand the liquid closure $q$, and for which there is provided a stop $r^1$.

What I claim as my invention and desire to secure by Letters Patent is:—

1. In a pyrometer of the type described, the combination of an air-chamber ($v^1$) adapted to be connected with the atmosphere, means for pressing a uniform quantity of liquid into said chamber, a second air-chamber ($v^2$) situated in the chamber of which the temperature is to be measured communicating with the former chamber, a receptacle containing liquid, an inverted jar dipping into the liquid, a pipe connecting the interior of the jar above the liquid with the former air-chamber, and means including a siphon and levers for measuring and registering the movements of said jar, as set forth.

2. In a pyrometer of the type described, the combination of an air-chamber ($v^1$), means for pressing a uniform quantity of liquid into said chamber, a second air-chamber ($v^2$) situated in the chamber of which the temperature is to be measured communicating with the former chamber, a receptacle containing liquid, an inverted jar dipping into the liquid, a pipe connecting the interior of the jar above the liquid with the former air-chamber, means comprising a siphon and levers for measuring and registering the movements of said jar, and means for eliminating the undesired action on the pyrometer due to varying atmospheric pressure, substantially as described.

3. In a pyrometer, the combination with an air chamber and means adapted to place said chamber in communication with the atmosphere; of a closed chamber adapted to be heated and communicating with the first mentioned chamber, means to liquid seal the first mentioned chamber from the atmosphere, and a movable liquid sealed bell into which said second chamber discharges upon sealing the first chamber from the atmosphere.

4. In a pyrometer, the combination with an air chamber and means adapted to periodically place said chamber in communication with the atmosphere; of a closed chamber adapted to be heated and communicating with the first mentioned chamber, means to liquid seal the first mentioned chamber from the atmosphere, a water column for actuating said means and a movable liquid sealed bell into which said second chamber discharges upon sealing the first chamber from the atmosphere.

5. In a pyrometer, the combination with an air chamber and means adapted to periodically place said chamber in communication with the atmosphere; of a closed chamber adapted to be heated and communicating with the first mentioned chamber, means to liquid seal the first mentioned chamber from the atmosphere, a periodically established liquid column to operate said means, means to establish said column, a liquid sealed movable bell into which said second chamber discharges upon sealing the first chamber from the atmosphere, and means to compensate the movement of said bell for variations in barometric pressure.

6. In a pyrometer the combination with an air chamber and means to place said chamber in communication with the atmosphere and having a capillary extension; of a movable liquid sealed bell into which said capillary extension enters, a chamber adapted to be heated and having a capillary connection with said extension and means to automatically and periodically connect and disconnect the first mentioned chamber with the atmosphere.

7. In a pyrometer, the combination with an air chamber normally open to the atmosphere and having an extension thereon; and means to automatically and periodically cut off said chamber from the atmosphere, of a liquid sealed movable bell over said extension, a closed chamber to be heated having a connection with said extension, means to compensate the movement of said bell for variations in barometric pressure, an indicator and a recorder actuated by the bell.

8. In a pyrometer, the combination with a chamber adapted to be heated; of a movable liquid sealed bell with which said chamber communicates and means to periodically connect the interior of the bell and chamber with the atmosphere.

9. In a pyrometer, the combination with a chamber adapted to be heated; of a movable liquid sealed bell with which said chamber communicates, means to periodically connect the interior of the bell with the atmosphere, and thereby admit a volume of air of known temperature to said chamber and means to compensate the movements of said bell for variations in atmospheric pressure.

10. In a pyrometer, the combination with a chamber adapted to be heated; of a movable liquid sealed bell with which said chamber communicates, means to automatically and periodically connect the interior of the bell with the atmosphere, and thereby admit a volume of air of known temperature to said chamber, means to compensate the movements of said bell for variations in atmospheric pressure and a recording device operated by said bell.

11. In a pyrometer, the combination with a chamber adapted to be heated; of a movable liquid sealed bell with which said chamber communicates, means to automatically and periodically connect the interior of the bell and chamber with the atmosphere and thereby admit a volume of air of known temperature to said chamber and means to maintain said bell and its sealing liquid at uniform temperature.

12. In a pyrometer, the combination with a closed chamber adapted to be heated and vented to the atmosphere; of a movable liquid sealed bell with which said chamber communicates, a movable sealing liquid column to seal the vent to the atmosphere, a liquid column to exert pressure on and move the sealing column, and means to periodically remove the liquid column, to periodically move the sealing column to open the vent.

13. In a pyrometer, the combination with a closed chamber adapted to be heated and vented to the atmosphere; of a movable liquid sealed bell, with which said chamber communicates, a movable liquid sealing column to control the venting to the atmosphere, a water column, a diaphragm between the water and sealing columns and a siphon to periodically remove the water from the column from the diaphragm.

14. In a pyrometer the combination with a closed chamber adapted to be heated and vented to the atmosphere; of a movable liquid sealed bell, means to maintain the bell and its sealing liquid at uniform temperature, a movable liquid sealing column to control the venting to the atmosphere, means to maintain said column at uniform temperature, a water column, a diaphragm separating the two columns, means to periodically discharge the water from the diaphragm, an indicator and a recorder operated by the bell and means to compensate the movements of the bell for barometric pressure.

15. In a pyrometer, the combination with an air chamber adapted to be heated; of a liquid-sealed movable bell, a second air chamber communicating with the first chamber and bell and vented to the atmosphere, means to force a constant volume of a sealing liquid into the second chamber and close its vent, and means controlled by barometric pressure to regulate the quantity of sealing liquid displaced into the second chamber, thereby compensating the movement of the bell for variations in barometric pressure.

16. In a pyrometer, the combination with an air chamber adapted to be heated; of a movable member moved by the expansion of air heated by said chamber, a second chamber having a capillary connection with the first chamber and with the movable member and vented to the atmosphere, means to move a volume of sealing liquid into the second chamber and close its vent, mechanism operated by barometric pressure to control the quantity of sealing liquid delivered to the second chamber, and hydraulic means to automatically and periodically operate the measuring liquid moving means and simultaneously stop the barometric control during the movement of the sealing liquid into said second chamber.

17. In a pyrometer, the combination with an air chamber vented to the atmosphere, a chamber adapted to be heated communicating with the first chamber, a liquid-sealed movable bell into which both chambers may discharge, means to liquid seal the vent of said first chamber, a pipe over the sealing liquid means, and means to periodically supply a liquid to said pipe.

18. In a pyrometer, the combination with an air chamber vented to the atmosphere and a chamber adapted to be heated and communicating with the first chamber; of means to move a constant volume of a sealing liquid to close the vent of the first chamber, means to periodically supply a quantity of liquid to the aforesaid means, and a siphon to discharge said last named liquid.

19. In a pyrometer, the combination with an air chamber having a vent to the atmosphere and a chamber adapted to be heated and communicating with the first chamber; of a diaphragm, a constant volume of a sealing liquid actuated by the diaphragm to seal the vent, an open-ended pipe over the diaphragm and means to periodically supply water to said pipe to exert pressure on the diaphragm to move the sealing liquid.

20. In a pyrometer, the combination with an air chamber having a vent to the atmosphere and a chamber to be heated having a capillary connection with the first chamber; of means containing a constant volume of a sealing liquid to seal said vent, hydraulic mechanism to move the sealing fluid and a movable member into which the air from said chambers can discharge.

21. In a pyrometer, the combination with an air chamber having a vent to the atmosphere and a chamber to be heated having a capillary connection with the first chamber; of means containing a constant volume of a sealing liquid to close said vent, means to exert pressure on said liquid to move it into vent closing position, and a member moved by the expanding air in said chambers.

22. In a pyrometer, the combination with a chamber to be heated; of a vertically movable bell communicating with said chamber, a tube venting both bell and chamber to the atmosphere having an enlarged end, and a branch, a liquid sealed movable bell into which said branch discharges, a controlling body longitudinally movable in said enlarged end and barometric compensating mechanism to move said body.

23. In a pyrometer, the combination with a chamber to be heated; of a liquid-sealed movable bell communicating therewith, a second liquid-sealed bell movable by variable barometric pressure, mechanism actuated by said second bell to control the volume of air admitted to said chamber and first bell.

In testimony that I claim the foregoing as my invention, I have signed my name in presence of two subscribing witnesses.

MAX ARNDT.

Witnesses:
 Henry Quadflieg,
 Elise Kalbusch.